324-77 CROSS REFERENCE SEARCH ROOM

Feb. 20, 1968 B. WENTWORTH 3,370,234

APPARATUS FOR PRODUCING A REPLICA OF REPETITIVE WAVEFORMS HAVING UNDESIRED VOLTAGES SUPERIMPOSED THEREON

Filed Sept. 28, 1965 3 Sheets-Sheet 1

INVENTOR
B. WENTWORTH
BY
ATTORNEY

APPARATUS FOR PRODUCING A REPLICA OF REPETITIVE WAVEFORMS HAVING UNDESIRED VOLTAGES SUPERIMPOSED THEREON

Filed Sept. 28, 1965 3 Sheets-Sheet 2

3,370,234

APPARATUS FOR PRODUCING A REPLICA OF REPETITIVE WAVEFORMS HAVING UNDESIRED VOLTAGES SUPERIMPOSED THEREON

Benning Wentworth, Rockaway, N.J., assignor to Bell Telephone Laboratories Incorporated, New York, N.Y., a corporation of New York Filed Sept. 28, 1965, Ser. No. 490,833
7 Claims. (Cl. 324—158)

This invention relates to preventing undesired components from appearing in output voltage waveforms. The invention is particularly useful when studying the speed of response of a circuit to an input signal change.

Undesired components sometimes appear in output voltage waveforms. In some cases these components do not interfere with the successful use of the output voltages, while in others they produce intolerable distortions. In the latter cases the undesired components must be eliminated or prevented before the output voltages can be of use.

An example of a case where an undesired component may appear is when switching a circuit so that its output changes between two levels. (The word "circuit" is used in a broad sense so as to include devices. Furthermore, the word "switch" and its derivatives as used refer to the changes that take place in a circuit in response to either a small or a large input signal change. The latter words are therefore not limited, as in some phases of the art, to changes between an "off" state and an "on" or saturated state.) When switching a circuit, the energy required to do the switching may unavoidably induce a voltage that appears superimposed on the output waveform. Since this induced voltage occurs during the time of switching, it appears during at least a portion of the time the output waveform is changing between its two levels. This may make it difficult if not impossible to detect the output state of the circuit until sometime after the circuit has been switched. This is a particular problem if it is desired to measure with precision the switching rate of the circuit because such an induced voltage will most likely becloud the area of interest in the output waveform.

An object of the present invention is to prevent substantially all of an undesirable component from appearing in an output voltage waveform.

Another object of the invention is to produce a display closely related to the switching characteristic of a circuit when its output is switched from one level to another.

These and other objects of the invention are achieved by producing a waveform having components related to the desired waveform and the undesired induced voltages. As produced, these two components occur separated in frequency, thereby permitting filtering to be used to eliminate substantially all of the undesired component.

In one embodiment of the invention, a device whose switching characteristic is to be studied has its output terminals connected to an alternating current source. The device is then recurrently switched back and forth between two operating conditions at a repetition rate at least twice that of the alternating current. While the device is being recurrently switched, its output voltage is sampled at progressively later times in each switching cycle with each sample being held until the next sample is taken. In accordance with the invention, the later sampling times in successive switching cycles increase at relatively small time increments. This causes the sampled output attributable to the undesired induced voltages to have a maximum frequency below a particular frequency. The sampled output is then filtered to remove all components below the particular frequency, thus eliminating the effects of the undesired induced voltages. By amplitude detecting the filtered samples and displaying the detected output on a recorder or oscilloscope, the switching characteristic of the device is made available for study.

These and other objects and features of the invention will become more apparent from a study of the following detailed description related to an illustrated embodiment.

Although the following description relates to obtaining the switching characteristic of a cryotron, the invention is not limited to such a use. A cryotron is, however, a good example of a device that presents problems when attempting to measure its switching characteristic. Very briefly, a cryotron is a four terminal device which is operated at a very low temperature (very close to "absolute zero"). In the absence of an input current, the impedance between its output terminals is zero. On the other hand, the presence of an input current causes a very small but finite impedance to exist between the output terminals. An output voltage waveform directly related to the impedance state of the device output circuit may be produced by passing a relatively constant current through the output circuit.

Some of the above described characteristics tend to make it difficult to measure the switching time of a cryotron. Firstly, refrigerators for providing the low operating temperatures do not always permit ample separation between the cryotron input and output leads. Voltages are therefore easily induced in the output because of coupling between the input and output leads. Secondly, the relatively small impedance change between the cryotron output terminals when switching between a zero input current and a finite current condition results in a relatively small output voltage change. This relatively small change is difficult if not impossible to study during the time of switching when an induced voltage is present. These problems are overcome when using the present invention as discussed below in conjunction with FIG. 2.

Figure 1:
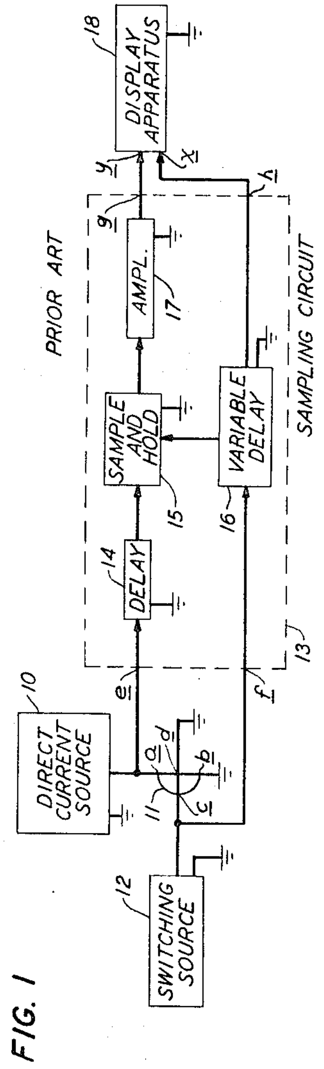
FIG. 1 shows in block diagram form a prior art testing arrangement.
Figure 2:
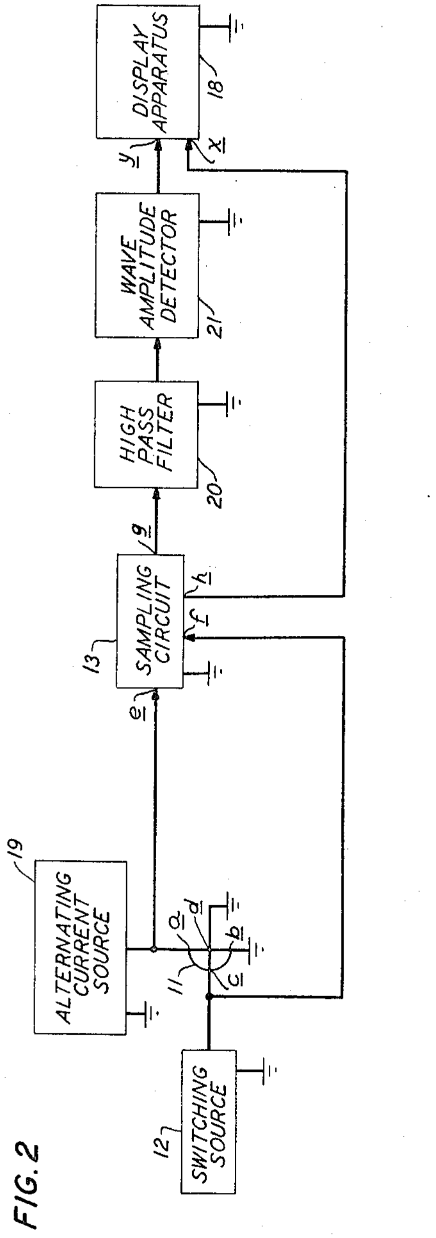
FIG. 2 shows in block diagram form an embodiment of the invention.

Before discussing the embodiment of the invention shown in FIG. 2, reference is made first to the prior art configuration of FIG. 1. This configuration includes a direct current source 10 connected to output terminals *a* and *b* of a cryotron 11. Source 10 provides a substantially constant amplitude current. Cryotron 11 is repeatedly switched between two output impedance states in response to rectangular waves from a switching source 12 connected to input terminals *c* and *d* of the cryotron.

Figures 3A, 3B, 3C, 3D, 3E, 3F:
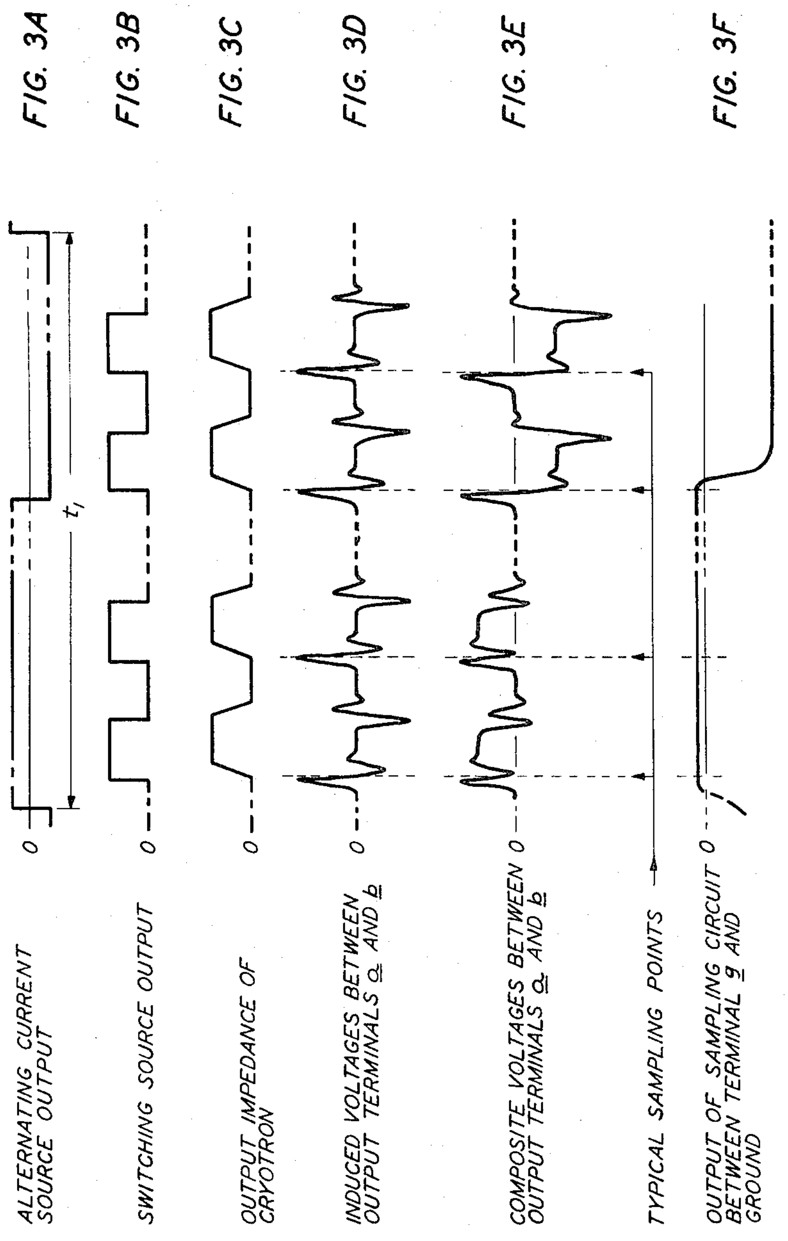
FIGS. 3A through 3F and 4A through 4D illustrate waveforms and characteristic curves for use in the following description of the embodiment of FIG. 2, with the first halves of FIGS. 3A through 3E also useful in explaining the operation of the prior art arrangement of FIG. 1.

Although FIGS. 3A through 3F are for use with FIG. 2, FIGS. 3A through 3E may also be used with FIG. 1 if only the left-hand portions are considered. When so used, FIG. 3A represents the direct current from source 10, FIGS. 3B represents the repetitive switching waveforms from source 12 and FIG. 3C represents the output impedance characteristic of the cryotron as measured between terminals *a* and *b*. Since the direct current from source 10 is substantially constant in amplitude, the voltages developed between the cryotron output terminals have trapezoidal waveforms substantially identical to the impedance characteristic shown in the first half of FIG. 3C. The switching speed of the device may be obtained by displaying at least a portion of these voltage waveforms as a function of time and measuring the time intervals for the leading and/or trailing edges.

The leading and trailing edges of voltage waveforms as described above may take place during relatively short time intervals. When this occurs, it is frequently desirable, if not necessary, to use a known sampling technique to facilitate the production of a waveform display. In accordance with this technique, a repetitive waveform is sampled each time that it occurs with each sample being produced as an output until the next sample is taken. Furthermore, the samples are obtained progressively later in time with respect to the waveforms so that each sample represents the instantaneous amplitude of a different portion of the repetitive waveform. For display purposes, these samples may be applied to the vertical or *y* input terminals of an oscilloscope having a step type of horizontal sweep, where the steps occur in synchronism with the samples. Equipment employing this technique is commercially available from several manufacturers of oscilloscopes.

The prior art configuration of FIG. 1 shows the basic elements of such sampling equipment in the form of a sampling circuit 13. This circuit includes a delay circuit 14, a sample and hold circuit 15, a variable delay circuit 16 and an amplifier 17. The voltages appearing between the output terminals *a* and *b* of cryotron 11 are delayed in delay circuit 14 and then applied to sample and hold circuit 15 by way of an input terminal *e* and ground. The output of switching source 12 is applied to variable delay circuit 16 by way of an input terminal *f* and ground. This circuit progressively increases the delay applied to the output of source 12 before applying it to sample and hold circuit 15 for gating purposes. By this arrangement, a sample of the cryotron output voltage waveform is taken and held each time the cryotron is switched so that successive portions of the repetitive waveform are sampled and held. The output of sample and hold circuit 15 therefore changes amplitude in steps. This output is amplified in amplifier 17 and appears between an output terminal *g* and ground. The output of amplifier 17 is applied to the vertical or *y* input of a display apparatus 18. The horizontal or *x* input of the display apparatus is driven in synchronism with the increasing delay provided by variable delay circuit 16. The display on apparatus 18 approximates a time stretched version of the repetitive waveform of the cryotron output voltages, which waveform has substantially the trapezoidal configuration shown in FIG. 3C.

The prior art configuration of FIG. 1 in many cases provides a useful output. When, however, the switching output of source 12 induces undesired voltages in the output of cryotron 11, these voltages may prevent successful measurments. The first half of FIG. 3D illustrates typical induced voltages. These voltages combine with the direct current produced voltages to produce composite voltages having the waveforms shown in the first half of FIG. 3E. Since the display on apparatus 18 of FIG. 1 approximates a time expanded version of a portion of one of the waveforms in the first half of FIG. 3E, it is believed apparent that it is not possible to measure the switching speed on the display.

The present invention overcomes the above-described problem by substantially eliminating the effects of the induced voltages in the display.

An embodiment of the invention is shown in FIG. 2. This embodiment, which produces a display of the switching characteristic of a cryotron, includes a switching source 12 and a sampling circuit 13 connected to a cryotron 11 in a manner identical to that shown in FIG. 1. Instead of a direct current source 10 as shown in the prior art configuration of FIG. 1, FIG. 2 includes an alternating current source 19 connected to output terminals *a* and *b* of cryotron 11. Source 19 produces an alternating current having substantially constant maximum amplitudes. Waveforms of this current are shown in FIG. 3A while the output of switching source 12 is shown in FIG. 3B.

(All of FIGS. 3A through 3E apply to the discussion of FIG. 2.)

The output of switching source 12 causes cryotron 11 to switch back and forth between two output impedance states. An idealized representation of the output impedance characteristic of the cryotron as a function of time is shown in FIG. 3C.

The switching source output causes voltages to be induced in the output of cryotron 11. These voltages are shown in FIG. 3D. It should be noted that the induced voltages produced by the leading edges of the switching source output are identical to one another while the induced voltages produced by the trailing edges are also identical to one another but opposite in polarity to the leading edge produced voltages.

The waveforms of the voltages developed between cryotron output terminals *a* and *b* by the alternating current from source 12 comprise a plurality of positive and negative trapezoidally shaped waves. The polarities of these waves are in synchronism with the polarities of the current wave shown in FIG. 3A. These voltages combine with the induced voltages of FIG. 3D to produce the composite voltages of FIG. 3E. It should be noted that the induced voltage portions of the composite voltages are identical for each switching cycle of the cryotron but that the voltage portions produced by the alternating current alternate in polarity in synchronism with the alternating current.

A sampling circuit 13 identical to that shown in FIG. 1 samples the composite voltage shown in FIG. 3E during each switching cycle and holds the sample until the next sample is taken. A line immediately below the composite voltages identifies typical sampling points in the switching cycles.

As discussed in the following paragraphs, the delay produced by the variable delay circuit of sampling circuit 13 increases at a relatively slow rate compared to that in the prior art configuration of FIG. 1. The four points identified in FIG. 3E therefore appear to be at the same time point in each switching cycle only because the delay added during each cycle of the alternating current from source 19 is very small and cannot be shown in the drawing.

The output between terminal *g* and ground of sampling circuit 13 under these conditions of operation is shown in FIG. 3F. It should be noted that this output is displaced so as to be asymmetrical with respect to ground by an amount equal to the value of the induced voltages at the sampling points. When sampling over other portions of the composite voltages, other values of displacement are produced because of the varying amplitudes of the induced voltages.

In accordance with the invention, the variable delay circuit of sampling circuit 13 of FIG. 2 produces a time delay which increases at a rate which is in orders of magnitude slower than in the prior art configuration of FIG. 1. This rate is slow enough to cause the induced voltage component of the output between terminal *g* and ground (identified in FIG. 3F as "displacement produced by induced voltages") to vary at a rate whereby its maximum frequency component is less than a predetermined value. The alternating current produced component of the output of sampling circuit 13, on the other hand, alternates in synchronism with the alternating current from source 19 and therefore has a frequency content which is substantially independent of the rate at which the variable delay is increased. Since the composite voltages of FIG. 3E comprise the algebraic summation of the induced voltages and the source 19 alternating current produced voltages, these two components also appear as algebraic summations. These components may therefore be separated, because of their frequency differences, by filtering circuits.

Figure 4A:
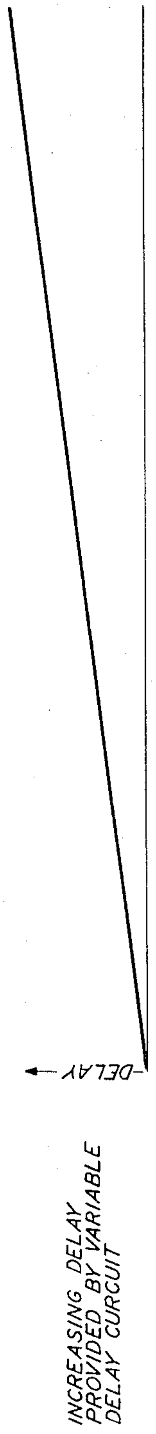
Figure 4B:
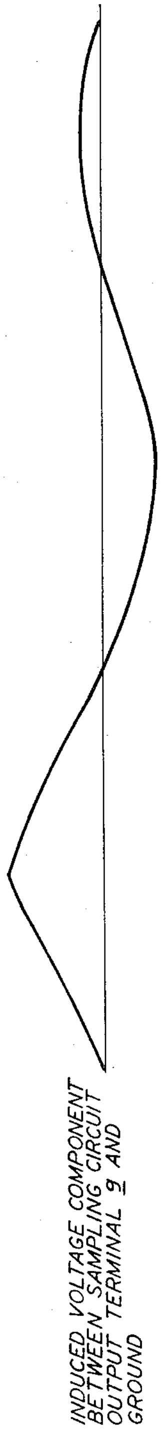
Figure 4C:
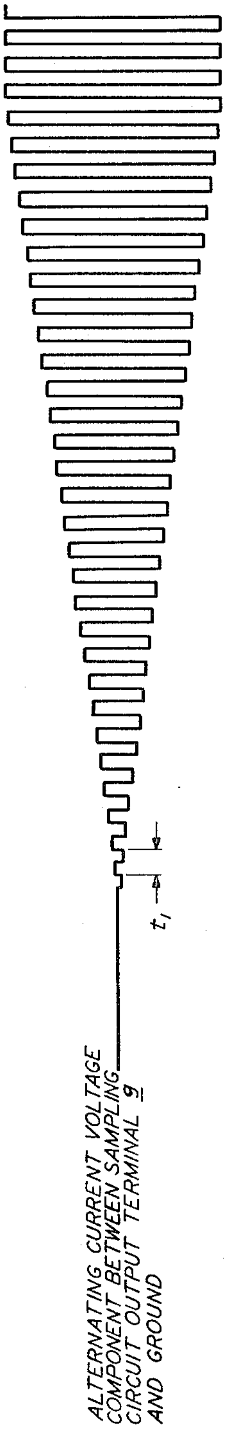

The waveforms shown in FIGS. 4A through 4D relate to sampling the leading edge of the output impedance characteristic of the cryotron by the embodiment of FIG. 2. The increasing time delay provided by the variable delay circuit of sampling circuit 13 is shown in FIG. 4A. The induced voltage component and the source 19 alternating current produced component of the sampling circuit output between terminals $g$ and ground are shown in FIGS. 4B and 4C, respectively. It should be noted that the elapsed time for FIGS. 4A, 4B and 4C is much greater than that of FIGS. 3A through 3F. In particular, the period of each cycle of the waveform of FIG. 4C is the same as that of the waveform of FIG. 3A. This has been indicated by the same time $t_1$ noted on these two figures.

The induced voltage component of the output between terminal $g$ and ground of sampling circuit 13 is substantially eliminated by passing this output through a high pass filter 20. This filter has a cut-off frequency in excess of the maximum frequency of the induced voltage component. The output of filter 20 therefore has a waveform substantially as shown in FIG. 4C.

Figure 4D:
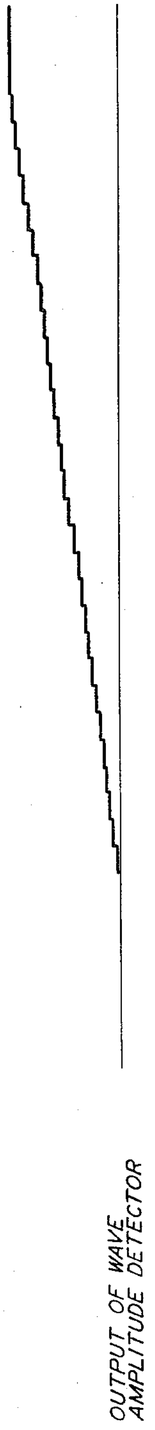

The output of filter 20 is applied to a wave amplitude detector 21 which produces an output shown in FIG. 4D. This output is applied to the vertical or $y$ input of a display apparatus 18 while a sweep output from between terminal $h$ and ground of sampling circuit 13 is applied to the horizontal or $x$ input of display apparatus 18. Apparatus 18 may comprise an oscilloscope or a pen recorder. A pen recorder has been found to be very desirable in some applications because of the length of time required to produce the curve of FIG. 4D.

As mentioned previously, the elapsed time for FIGS. 4A through 4D is much greater than that for FIGS. 3A through 3F. In other words, FIG. 4D is essentially a time expanded portion of FIG. 3C where the expansion factor is directly related to the rate at which the delay provided by delay circuit 16 is increased. The time base of FIG. 4D may therefore be rescaled by dividing the time base by the expansion factor, thus enabling time measurements to be made.

As discussed previously, the delay provided by the variable delay circuit of sampling circuit 13 is increased at a rate sufficiently small to cause the induced voltage component appearing between terminal $g$ and ground of sampling circuit 13 to have a maximum frequency value less than a predetermined value. In other words, the output of the variable delay circuit has a repetition rate which is slightly less than that of the output of source 12.

Once the delay rate has been established, the definition of the display (i.e. the waveform of FIG. 4D) is directly related to the alternating rate of the alternating current from source 19. For example, for the delay rate increase shown in FIG. 4A, the voltage change per step may be halved by doubling the alternating rate of the current from source 19.

In accordance with the invention, the alternating rate of the output from switching source 12 should be sufficiently high so that substantially the maximum positive and negative voltages produced by each cycle of the alternating current from source 19 are sampled. This assures that each part of the output of wave detector 21, and therefore the display, is produced under the same test conditions. In the disclosed embodiment this requires the rate of the output of switching source 12 to be at least twice the rate of the alternating current from source 19. If this condition is not met, then the display of FIG. 4D would be missing one or more steps.

The invention has been discussed in the context that alternating current source 19 produces rectangularly shaped outputs that alternate between positive and negative levels. The invention is fully operative when source 19 produces outputs having other waveforms. In one embodiment of the invention, a source of sixty cycles per second sinusoidal current was employed. The alternating rate of the switching source output in that embodiment was two thousand cycles per second. The large ratio between these two rates enabled substantially the maximum positive and negative values of each cycle of the voltage produced by the sixty cycle current to be sampled.

The invention is fully operative when the output from source 19 alternates between any two levels such as a positive level and ground. In other words, the objects of the invention are achieved as long as the desired output of the device appears in a modulated form, while the undesired voltages appear in an unmodulated form.

With the above paragraph in mind, it is believed apparent that the present invention may also find use in other applications. It may, for example, find use in radar apparatus. In such apparatus it is a common occurrence for a portion of the transmitter energy to be unavoidably coupled into the radar receiver each time a pulse of energy is transmitted. This coupled energy may then appear as a voltage superimposed on echo return signals being processed by the reciver. This, however, may be prevented through the use of the present invention. When using the present invention in radar apparatus, the echo return signals are periodically blocked from the receiver so that the echo return signals appear in a modulated form. The undesired voltages appearing in the receiver still occur, however, at the rate at which pulses of energy are transmitted. The modulated echo return signals and the undesired voltages are then sampled, filtered and amplitude detected, as shown in the embodiment of FIG. 2. This results in attenuating substantially all of the undesired cross-coupled transmitter energy with the result that a clear indication of a target is produced.

Although only one embodiment of the invention has been disclosed and described in detail, various other embodiments may be devised by those skilled in the art without departing from the spirit and scope of the invention.

What is claimed is:

1. Apparatus for indicating the switching characteristic of a circuit having a pair of input terminals and a pair of output terminals when an undesired voltage is produced between said output terminals during each switching cycle by switching energy applied to said input terminals, said apparatus comprising, a source of current connected to said circuit output terminals, said current changing between two amplitude levels at a repetition rate in excess of a predetermined value and having substantially constant maximum and minimum amplitude levels, a source connected to said circuit input terminals to switch said circuit back and forth between two operating conditions at a repetition rate at least twice said curent rate, means connected to said circuit output terminals to sample the voltage therebetween once during each switching cycle with samples taken at later times in successive switching cycles and to produce each of said samples as an output until the next of said samples is taken, said later times in successive switching cycles increasing at time increments small enough to cause said sampling means output attributable to said undesired voltage to have a maimum frequency less than said predetermined value, high pass filter means connected to said sampling means and having a cut-off frequency at substantially said predetermined value, wave amplitude detecting means connected to said high pass filter means, and means connected to said amplitude detecting means and said sampling means to display the output of said wave amplitude detector as a function of time.

2. Apparatus for indicating the switching characteristic of a circuit having a pair of input terminals and a pair of output terminals when an undesired voltage is produced between said output terminals by switching energy applied to said input terminals, said apparatus comprising,
an alternating current source connected across said circuit output terminals,
said current alternating at a repetition rate in excess of a predetermined value and having substantially constant levels of current extremes,
a source connected to said circuit input terminals to switch said circuit back and forth between two operating conditions at a repetition rate at least twice said alternating current rate,
sampling means connected across said circuit output terminals to obtain samples of the voltage appearing therebetween and to produce each of said samples as an output until the next of said samples is taken,
means providing an increasing time delay to signals passing therethrough connected between said switching source and said sampling means to time the production of said samples to produce in response to said undesired voltage an output having a maximum frequency less than said predetermined value,
high pass filtering means connected to said sampling means and having a cut-off frequency substantially equal to said predetermined value,
wave amplitude detector means connected to said high pass filter, and
means connected to said detecting means and said time delay means to display the output from said detecting means as a function of the increasing time delay produced by said time delay means.

3. Apparatus for indicating the switching characteristic of a circuit having a pair of input terminals and a pair of output terminals when an undesired voltage is caused to appear between said output terminals as a result of cross coupling of some of the switching energy applied to said input terminals,
said apparatus comprising,
a source of alternating current connected to said circuit output terminals,
said current alternating at a repetition rate in excess of a predetermined value,
a source connected to said circuit input terminals to switch said circuit back and forth between two operating conditions,
sample and hold means connected to said circuit output terminals,
increasing time delay means connected between said switching source and said sample and hold means to time said sample and hold means to produce in response to said undesired voltage an output having a maximum frequency less than said predetermined value,
said switching source having a switching repetition rate sufficient to cause said samples to include substantially each maximum value of the voltage developed between said circuit output terminals by said alternating current,
high pass filtering means connected to said sample and hold means and having a cut-off frequency substantially equal to said predetermined value,
wave amplitude detector means connected to said high pass filter, and
means connected to said detecting means and said time delay means to display the output from said detecting means as a function of the increasing time delay produced by said time delay means.

4. Apparatus for measuring the switching time of a circuit when the circuit is switched between two operating conditions by switching energy applied to its input terminals and an undesired voltage is produced between its output terminals during the switching cycle by energy affecting the switching,
said apparatus comprising,
a source of current alternating at a first repetition rate and having substantially constant maximum amplitudes,
means connecting said alternating current source to said circuit output terminals,
a source connected to said circuit to switch said circuit back and forth between two operating conditions at a second repetition rate at least twice said first rate,
means producing timing signals at a third repetition rate which is slightly less than said second rate,
sample and hold means connected across said circuit output terminals and responsive to said timing signals to produce an output in which the portions attributable to said undesired voltage have a maximum frequency less than said first rate,
high pass filter means connected to said sample and hold means and having a cut-off frequency between said first rate and said maximum frequency of said output portion attributable to said undesired voltages,
wave amplitude detecting means connected to said high pass filter means, and
means connected to said wave detecting means and said sampling means to display the output of said wave amplitude detecting means as a function of time.

5. Apparatus for measuring the switching time of a circuit when the circuit is switched between two operating conditions by switching energy applied to its input terminals and an undesired voltage is produced between its output terminals as a result of cross coupled switching energy,
said apparatus comprising,
a source of current alternating at a first repetition rate which is in excess of a predetermined value and having substantially constant maximum amplitudes,
means connecting said alternating current source to said circuit output terminals,
a switching source connected to said circuit input terminals to switch said circuit back and forth between two operating states at a second repetition rate,
means producing timing signals at a third repetition rate which is slightly less than said second rate,
sample and hold means connected to said circuit output terminals and responsive to said timing signals to produce an output in which the portion attributable to said undesired voltage has a maximum frefrequency less than said first rate,
said second rate having a sufficient high value to assure that said samples include substantially each maximum value of the voltage produced by said alternating current,
high pass filter means connected to said sample and hold means and having a cut-off frequency between said first rate and said maximum frequency of said output portion attributable to said undesired voltage,
wave amplitude detecting means connected to said high pass filter means, and
means connected to said wave detecting means and said sample and hold means to display the output of said wave amplitude detecting means as a function of time.

6. Apparatus for producing a replica of at least a portion of a recurring waveform that changes amplitude in a periodical manner at a frequency greater than a predetermined value and has superimposed thereon an undesired voltage that does not change amplitude with said waveform,
said apparatus comprising,
means for sampling each of said recurrent waveforms with samples taken at later times in successive ones of said waveforms and producing each of said samples as an output until the next of said samples is taken,
said later times in said successive waveforms increasing at time intervals that cause said sampling means output attributable to said undesired voltages to have a maximum frequency less than said predetermined value, high pass filter means connected to said sampling means and having a cut-off frequency at substantially said predetermined value, wave amplitude detecting means connected to said high pass filter means, and utilization means connected to said wave amplitude detecting means.

7. Apparatus for producing a replica of at least a portion of a desired output waveform produced by a circuit when the circuit is switched between two operating conditions and an undesired voltage is superimposed on said waveform, said apparatus comprising, means connected to said circuit to repetitively switch said circuit between said operating conditions at a first repetition rate, means connected to said circuit to periodically change in amplitude said desired waveform at a second repetition rate no greater than one half of said first rate, means connected to said circuit to sample each of said repetitive waveforms with samples taken at later times in successive waveforms and to produce each of said samples as an output until the next of said samples is taken, high pass filter means connected to said sampling means and having a cut-off frequency that passes substantially only the output of said sampling means attributable to said desired output waveforms, wave amplitude detecting means connected to said high pass filter means, and means connected to said wave amplitude detecting means to make available the output therefrom.

References Cited

UNITED STATES PATENTS

| | | | |
|---|---|---|---|
| 2,443,794 | 6/1948 | MacNichol | 324—26 |
| 2,616,058 | 10/1952 | Wagner | 324—57 X |
| 2,847,646 | 8/1958 | Marino | 324—158 |
| 3,007,113 | 10/1961 | Kreinberg | 324—158 |
| 3,074,017 | 1/1963 | Sunstein | 324—158 |

RUDOLPH V. ROLINEC, *Primary Examiner.*

E. L. STOLARUN, *Assistant Examiner.*